F. W. HILLARD
TYPEWRITER.
APPLICATION FILED MAY 18, 1894.

1,337,977

Patented Apr. 20, 1920.
5 SHEETS—SHEET 1.

Witnesses:
Samuel W. Balch
Hyatt Whitman

Inventor,
Frederic W. Hillard
by Thomas Ewing, Jr.
Attorney.

F. W. HILLARD.
TYPEWRITER.
APPLICATION FILED MAY 18, 1894.
1,337,977.
Patented Apr. 20, 1920.
5 SHEETS—SHEET 2.
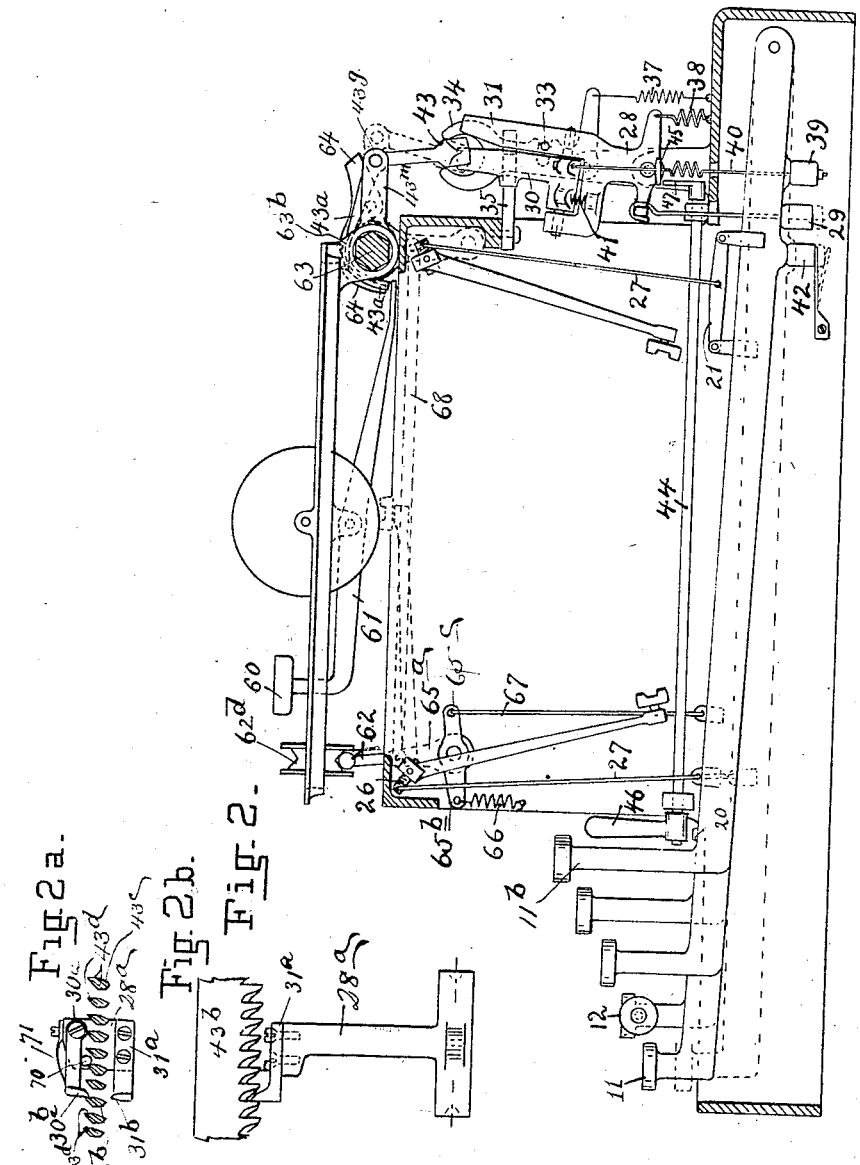
Witnesses:
Samuel W. Balch
Hy. A. Whitman
Inventor,
Frederic W. Hillard,
by Thomas Ewing, Jr.
Attorney

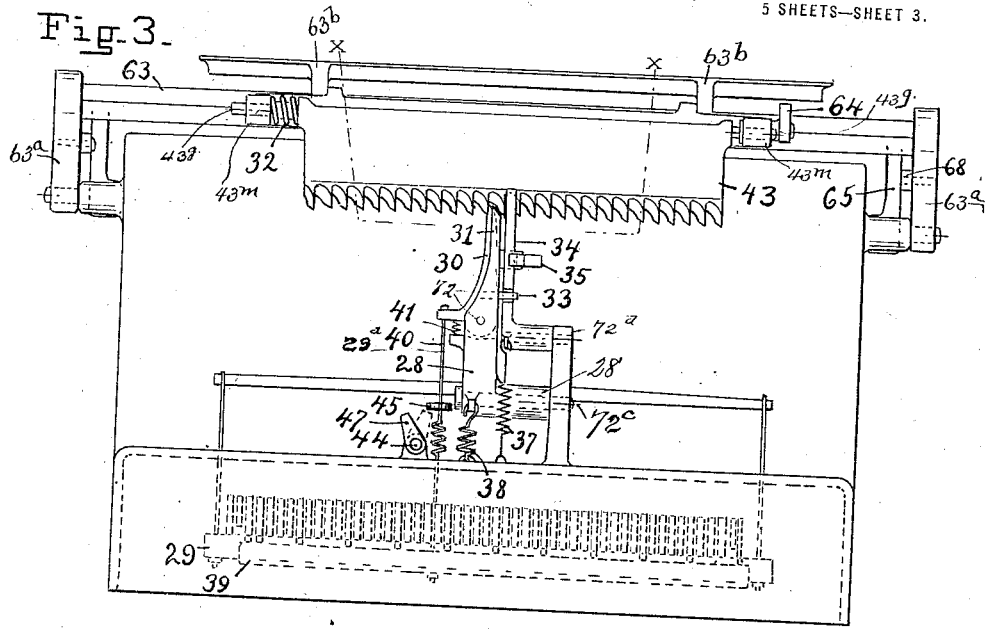
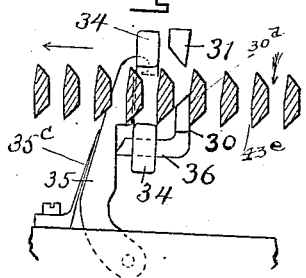
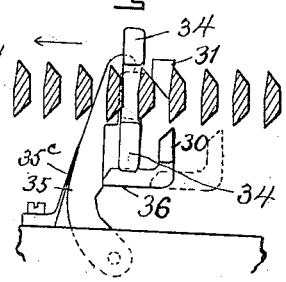
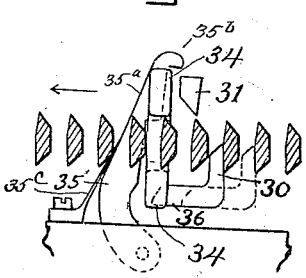
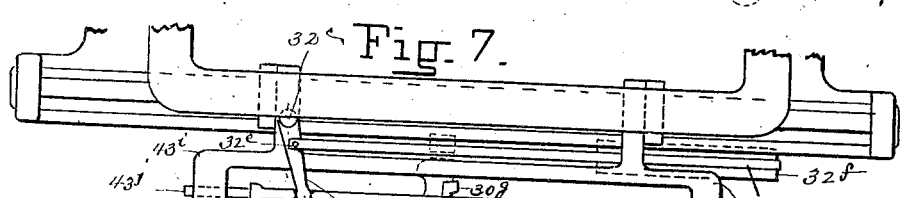

F. W. HILLARD.
TYPEWRITER.
APPLICATION FILED MAY 13, 1894.

1,337,977.

Patented Apr. 20, 1920.
5 SHEETS—SHEET 4.

WITNESSES

INVENTOR
Frederic W. Hillard
BY Thomas Ewing, Jr.
ATTORNEY

F. W. HILLARD.
TYPEWRITER.
APPLICATION FILED MAY 18, 1894.

1,337,977.

Patented Apr. 20, 1920.
5 SHEETS—SHEET 5.

Witnesses:
Samuel W. Balch
Hy H. Whitman

Inventor,
Frederic W. Hillard,
by Thomas Ewing Jr
Attorney

UNITED STATES PATENT OFFICE.

FREDERIC W. HILLARD, OF TOTTENVILLE, NEW YORK, ASSIGNOR OF ONE-HALF TO MARY R. HILLARD, OF MIDDLEBURY, CONNECTICUT.

TYPEWRITER.

1,337,977. Specification of Letters Patent. Patented Apr. 20, 1920.

Application filed May 18, 1894. Serial No. 511,685.

*To all whom it may concern:*

Be it known that I, FREDERIC W. HILLARD, a citizen of the United States of America, and residing at Tottenville, Richmond county, New York, have invented certain new and useful Improvements in Typewriters, of which the following is a specification.

My invention is an improvement in typewriting machines, and it consists in the various devices and combinations shown and described in this specification, and which are particularly pointed out in the accompanying claims. Among the more important features of my invention are the following: a novel and advantageous key-board, arranged for single spacing with the usual letters and characters, and the usual grouping of the same in the key board, together with one or more additional rows of keys connected with certain characters, and means for double spacing with these latter keys: a novel and advantageous arrangement of the key levers, whereby two keys are connected with the same type characters, and one of the keys is connected with the single spacing mechanism, and the other with the double spacing mechanism: a novel and advantageous escapement mechanism, both for single and letter spacing and for double and word spacing, and a novel and advantageous paper carriage.

In the application of my invention I show many details of construction which I believe to be new and advantageous in the art. These details are herein described and claimed.

In the accompanying drawings which form a part of this specification:

Figure 1 is a top view of the machine with the carriage removed and the rack partially broken away. The general arrangement of the Remington key-board is preserved. The shaded keys in the second row from the top are double spacing initial letter keys. The shaded punctuation-key in the fourth row is a double spacing terminal. The unshaded keys, except the shift-keys, are single spacing keys.

Fig. 2 is a sectional side elevation of Fig. 1, and shows the carriage in place.

Figs. 2ª and 2ᵇ show a detail modification of the escapement mechanism of Figs. 1, 2, 3, 4, 5, and 6, designated for single spacing, the rack teeth being shown in section in Fig. 2ª.

Fig. 3 is a rear elevation of Figs. 1 and 2 showing the escapement mechanism.

Figs. 4, 5 and 6 are positional detail views of the escapement mechanism of Figs. 1, 2 and 3.

Fig. 7 shows a modification for feeding the rack relatively to the carriage during the feed movement of the carriage by the pull of the carriage propelling spring.

Figure 8:
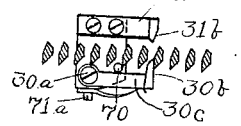
Figure 9:
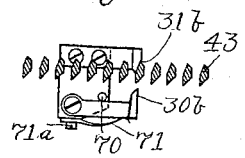
Figure 10:
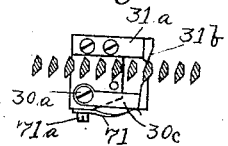
Figure 11:
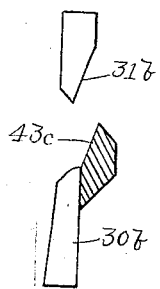
Figure 13:
Figure 14:
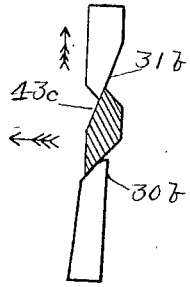
Figure 8A:
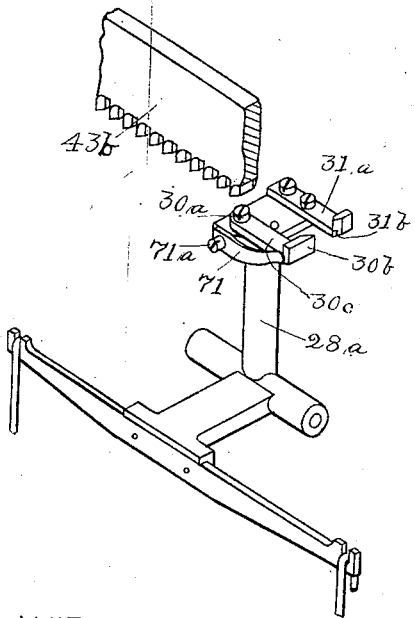
Figure 12:
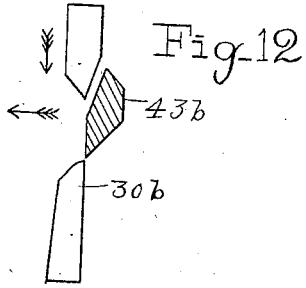

Figs. 8, 9 and 10, are positional detailed views of the single spacing escapement with the rack teeth shown in section; and Figs. 11 to 14, inclusive, are enlarged detailed views of the dogs and rack teeth thereof; Figs. 8 to 11 showing the normal position of the parts; Fig. 12 showing the position the parts occupy when a key has been partially depressed (say two-thirds) with a staccato blow; Figs. 9 and 13 showing the position on the depression of a key; and Figs. 10 and 14 showing the position of the parts when the depressed key is returning to its normal position after its release.

Fig. 8ª is a perspective view of the single spacing escapement in its normal position.

Figure 15:
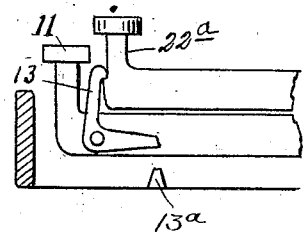

Fig. 15 is a side elevation of a device for connecting the period key to the shifting lever by a tripping lock.

Figure 16:
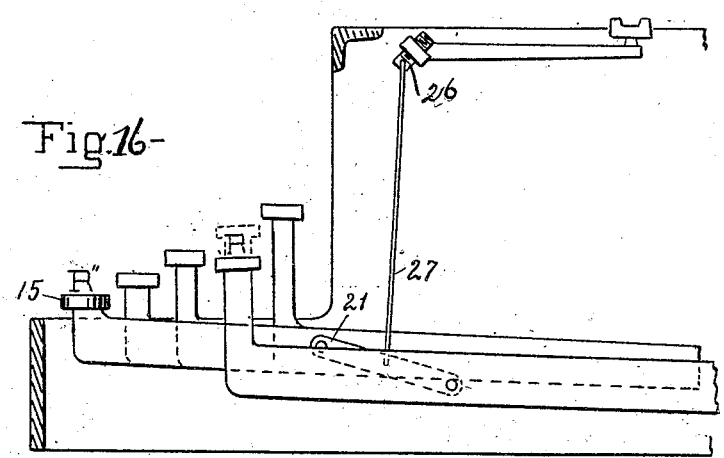

Fig. 16 is a modification in which the key levers are carried to the rear of the machine and double and single spacing key levers are independently attached to the same type bar.

Figure 1:
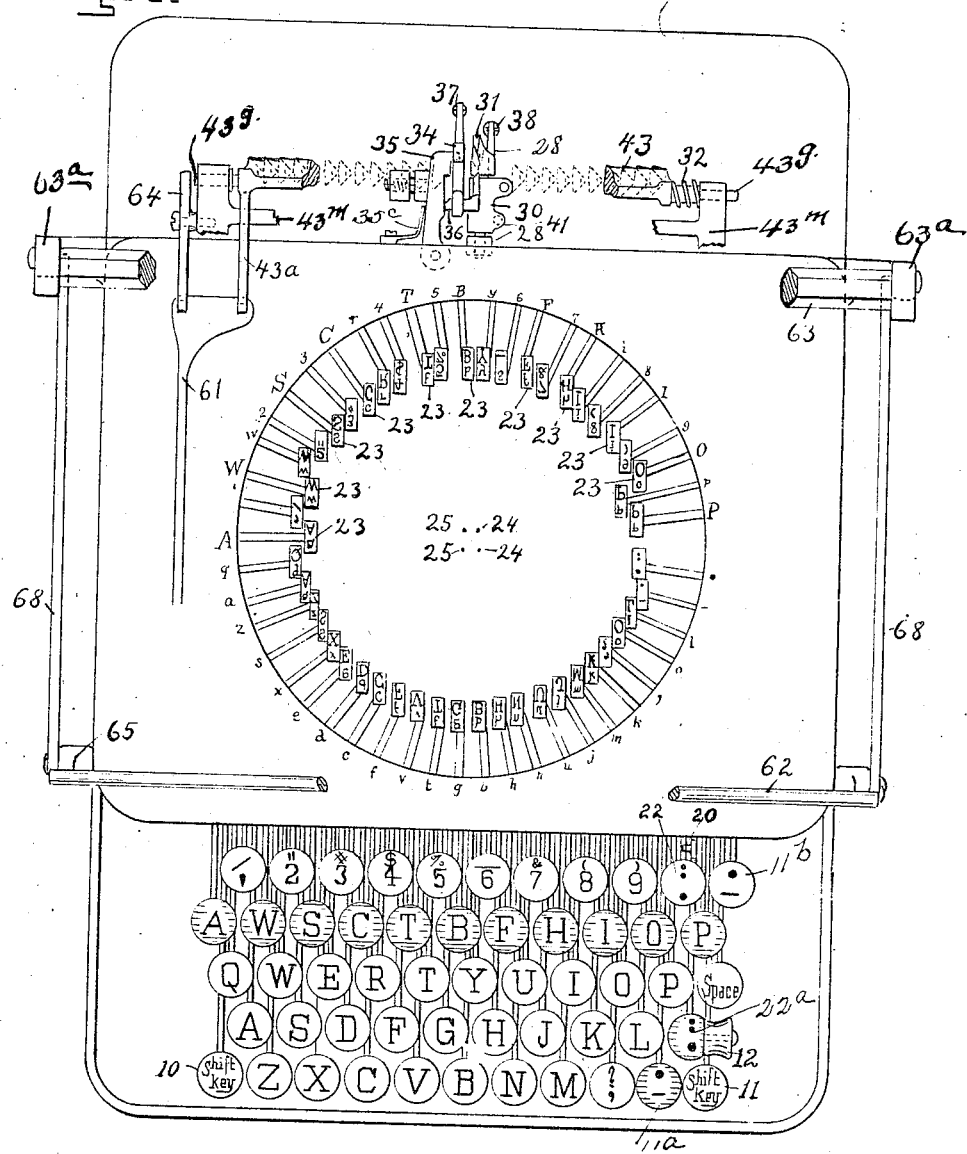
Figure 17:
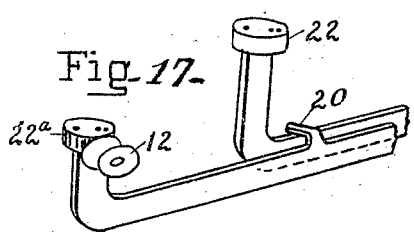

Fig. 17 is a perspective view of the period and colon key levers of Figs. 1 and 2, showing the means for connecting the double spacing key levers with the single spacing key lever by means of a lug. In this construction the two key levers are not both independently connected to the type bar, the double spacing key lever being dependent on the single spacing key lever in operating the type bar.

Figure 18:
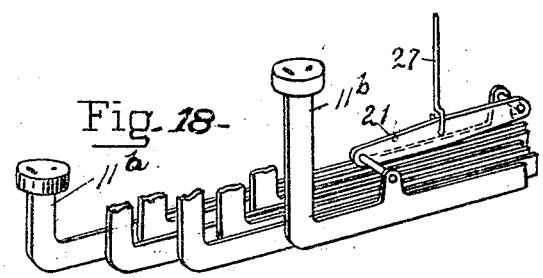

Fig. 18 is a perspective view of the connection between the period and hyphen key levers of Figs. 1 and 2.

General operation.

In the mechanism shown, the spacing of the carriage follows the printing. Those type-bars which carry characters which are most frequently initial characters are duplicated, and one set of them is connected with double spacing mechanism, and the other set with the single spacing mechanism. The characters on the set of type bars connected with the double spacing mechanism are so positioned on the type bars that they print one letter space ahead of the printing point of the letters on the rest of the type-bars; so that, after the last letter of a word is printed, the carriage is fed forward in the usual way one letter space, and when the intial letter of the next word is printed it will, if it be one of the selected initial letters connected with the double spacing mechanism, be printed an extra letter space ahead, making two letter spaces between the two letters, and the carriage will then, without operation of any other key or spacing bar, be fed forward two letter spaces. This insures that the next letter shall come at the right place in the line.

In case a word begins with a letter which is not one of the selected initial letters, it is necessary to space between the words by operating the spacing key at the right hand end of the middle bank of keys.

The key boards.

On the key-board shown in Fig. 1 there are arranged in the second bank from the top eleven keys on which are the most frequent initial letters. These keys are double spacing, and they print both small and capital letters. The mechanism for effecting the spacing and for shifting the carriage will be hereinafter described. These keys are for printing the letters when they occur as initials, and single spacing keys for printing the same letters are also provided in the key-board. Shift keys 10 and 11 at each end of the lower bank change the printing from lower case to capitals on being depressed. Next to the shift key 11 in the front-bank, is a double spacing key 11$^a$ for printing the hyphen (-) lower-case, and the period (.) uppercase; at the right hand end of the upper bank is a single spacing key 11$^b$ for printing the same characters. These two keys are both independently connected to the same type-bar. Next to the right-hand end key on the upper bank is a single spacing key 22 for printing the period (.) lower case and the colon (:) upper-case. At the right hand end of the fourth bank from the top is a double spacing key 22$^a$ for printing the same characters. This key is connected to the key 22 and so operates the same type-bar. Attached to the side of this key there is a roller 12. The shift key 11 is conveniently positioned below and in front of this roller. When the period key is depressed by striking the roller and the key thereby carried down to the lowest level, where it is about on a level with the shift key in the row below it, the finger is readily moved forward from the roller, onto the shift key, thus successively depressing the punctuation key and the shift key with one stroke.

In Fig. 15 another way is shown, in which the printing of the period and shifting of the carriage may be combined in one finger movement. A latch 13 is pivoted on the shift key lever which locks onto the period key-lever 22$^a$ and depresses that key during the first part of the stroke on the shift key until the period is printed, when the latch, by contacting with a stop 13$^a$ on the frame of the machine, is tripped off from the period key lever and the shift key then shifts the carriage, the period meanwhile returning to normal position.

I do not wish to limit myself in the application of the foregoing improvement for shifting from lower case to upper case, to the use of a key for shifting the carriage, as it is applicable with shift keys, independently of the vehicle shifted.

The key levers.

The key levers, as shown in Figs. 1, 2 and 3, are pivoted at the back of the machine in the usual manner, and most of them are directly attached to the type-bars by means of the connecting wires 27. The key-lever 22 is attached to a connecting wire in the same manner; but the other key-lever 22$^a$ which prints the colon (:) and the period (.) is not directly connected with any type bar, but there is a lug 20 on this lever which extends over the lever 22 so that when it is depressed the lever 22 is also pulled down, thus operating the type-bar and printing the period or colon. These two key levers are adjacent to one another as shown in Fig. 17. There are also two keys, a single spacing key 11$^b$ and a double spacing key 11$^a$, for operating the type bar which prints the hyphen (-) lower case and the period (.) upper case. But as their key levers are not adjacent to one another a different device is employed for connecting them to the type-bar. Hinged to the two levers is the sub-lever 21, and the connecting wire is linked to the sub-lever at about its middle. Either one of the two keys may be independently depressed without depressing the other. This device is shown in larger scale in Fig. 18.

In Fig. 16, the type bar which carries a selected word spacing character is connected with two key levers by means of the sub-lever 21 which is hinged to each. There must be a little play at the hinges. Either key lever can be depressed without depressing the other, and one of the keys effects single spacing, the other double spacing. The mechanism by which this is accomplished is described later on.

The type-bearing mechanism.

By the term "printing-member" I mean the vehicle of a single printing character, e. g., a single type-bar or a type wheel considered as the vehicle of a single character. I do not, however, wish to so limit this term as to include within its scope only type-wheel and type-bar machines, as it is immaterial what the form of the vehicle of the characters may be.

The type-bars shown are of the usual form, except that they are attached to the connecting wires by adjusting screws; and those bars 23 23 which carry frequent initial letters and which are operated by keys connecting with double spacing mechanism, have their type so set as to print at the points 24 24, one letter space ahead of the printing centers 25 25 of the other type-bars, as already explained. In the upper end of all the type-bars are set the adjusting screws 26 to which the wires 27 that connect the type-bars with the key-levers are attached; this adjustment is important to equalize the difference in the depth of plunge of the different keys, experienced in many machines.

The type.

In Fig. 1 there is shown a set of type in which the most frequently occurring initial letters are placed on duplicated type-bars. The duplicated characters are on the type-bars 23 23, and they form an important feature of my invention. Each frequently occurring initial letter which is duplicated is arranged so that when one of the duplicated type-bars of any pair is operated single spacing is had, and when the other type-bar is operated word spacing is had.

The carriage and spacing mechanism.

I show herein two forms of escapements, viz: an escapement designed for single spacing, and an escapement designed for both single and double spacing. The single and double spacing escapement, which for brevity will be hereinafter termed the double spacing escapement, is shown as applied to a machine in Figs. 1, 2, 3, and in detail in Figs. 4, 5, 6, inclusive. It includes a swinging rack of the type shown and described in Letters Patent No. 554,874, dated February 18, 1896, and No. 580,281, dated April 6, 1897, heretofore granted to me. The single spacing escapement is more particularly shown in Figs. 2$^a$ and 2$^b$ and in Figs. 8 and 8$^a$ and 9 to 14, inclusive, but as it differs constructionally from the double spacing escapement only in the suppression of certain features of the latter, it is also shown in the figures above specified as illustrating that form of my invention. Thus the swinging of the rack of my prior patents, before specified, as forming a part of the combined single and double spacing escapement, is, in the single spacing escapement, suppressed, so that the rack becomes a non-swinging rack, also shown in my prior Patent 554,874, above referred to, and in my prior Patent 577,982, dated March 2nd, 1897. In the same manner the reciprocating motion of the pivoted dog of the double spacing escapement in the line of the carriage feed, is, in the single spacing escapement suppressed so that the dog has only a movement into and out of the rack.

As I have specifically shown the double spacing escapement as mounted on the machine frame in Figs. 1, 2 and 3, I will first describe that form of my invention.

A dog rocker 28 is mounted on pivots 72$^c$ on the machine frame and is rocked thereon by the depression of each key through the middle universal bar 29, which, as is usual, is connected to the rocker by wires 29$^a$ 29$^a$. The dog rocker carries a normally engaged pivoted or flexible spring actuated dog 30 and a normally disengaged rigid dog 31, the terms "normally engaged" and "normally disengaged" having reference to the engagement and disengagement of the respective dogs with the rack 43, when the keys are in their normal position.

When the dog rocker is swung in, as by the depression of a key, the dog 30 is disengaged from the rack and the dog 31 engaged therewith. As the two dogs are slightly staggered in relation to each other, the rack will advance slightly under the pull of the main spring (not shown in Figs. 1 to 6) when released from the dog 30, and before contacting with dog 31, and this movement will be generally sufficient to permit dog 30, upon return of the parts to normal position, to enter the rack and engage therewith at the tooth immediately behind the one with which it was engaged at the beginning of the stroke, thus permitting the rack and the parts with which it is connected to move forward a complete "space." To insure this reëngagement of dog 30, I may, as illustrated in the several figures showing the details of both my single spacing escapement and also of my double spacing escapement, bevel the rear faces of the rack teeth and dogs, as described and claimed in my Patent No. 580,281, hereinbefore referred to.

This reëngagement is also insured by making the normally engaged dog in two pieces, the upper portion pivoted upon the body portion of the dog by a vertical pivot, as in the single spacing escapement, so that the upper or rack engaging part can vibrate transversely to the direction of the rack feed, relatively to the normally disengaged dog, whereby when the upper pivoted part is started into the rack to engage the tooth in the rear of that from which it was disengaged, it may yield a little on its pivot to permit the dog 31 to be withdrawn.

This provision for transversely vibrating one dog on its pivot relatively to the other is made because the two dogs are staggered with relation to each other only slightly, and because in rapid writing the rack will advance through but a small portion of the latter space while the dog 30 is disengaged from the rack; and consequently, if it were not for the vertical pivot in the dog 30, the nose of that dog might butt against the rack tooth before the dog rocker 28 had been returned sufficiently toward normal position to disengage dog 31, in which case dog 31 would not be disengaged and the letters would be printed the one over the other. The vertical pivot removes this difficulty and permits dog 31 to be freely withdrawn from the rack. The pivotal movement of the upper pivoted part of the dog 30 is controlled by a spring and limiting pin upon the top of the body portion of the dog, as in the single spacing escapement. To still further obviate the difficulty of properly engaging and disengaging the two dogs with the rack teeth, an open space is left between the dogs of a width a little less than the width of the rack, this being well known.

An escapement as above described is fully operative for single spacing, as will be shown in connection with the single spacing form of my invention, but to better adapt it to double spacing I provide means for reciprocating the normally engaged dog 30, when disengaged from the rack, in the line of the rack feed.

I preferably combine with the double spacing escapement certain other novel features hereinafter described, all of which tend to increase the rapidity and ease of the escapement, although it will be understood that such features are independently applicable to single spacing. I do not wish to limit my claims on such features to their use together or separately in a double spacing escapement, and I have, in my showing of my single spacing escapement, shown some of the said features incorporated therein, as will be hereinafter more fully described.

The normally engaged dog 30 is mounted at its lower end on a pivot 72, carried by the dog rocker, so that the dog is capable of an independent movement on the rocker in the line of the rack feed; although in single spacing the pivot is inoperative, the dog being then held at the limit of its forward movement by the spring 41. Each of the double spacing key levers has on its lower edge a teat that projects downwardly and contacts with the bar 39, which is connected to the dog 30 by a wire 40, and which when depressed vibrates the dog on its pivot 72 rearwardly or in a direction opposite to that in which the rack is spaced. Thus the depression of a double space key imparts this rearward movement to the dog 30, and the parts are so proportioned that such movement is sufficient to cause the dog to reëngage the rack at the second tooth behind the one from which it was disengaged, instead of at the first tooth back, as is the case when the dog is not moved upon its pivot 72, as in single spacing. This rearward movement of the dog therefore, permits the rack to move forward an additional tooth space which results in double spacing.

It will be seen that in this form of my escapement the engaging part of the face $30^d$ of the dog 30 is capable of moving around three separate axes of vibration, each of which is at right angles to the other. These axes are the dog rocker pivots $72^c$, around which the rocker and parts carried thereon move as a whole; the pivot 72, on which the dog 30 moves relatively to the dog 31; and the vertical pivot, around which the upper pivoted part of the dog moves in relation to both the dog 31, and the body portion of the dog 30. It will, moreover, be seen that the dog pivot 72 is inoperative in single spacing, but is operative in double spacing.

I also use as above stated, a swinging rack such as is shown in my said prior patents, whereby a buckle joint is formed. The operation and advantages of such buckle joint are fully pointed out in my prior patents and will not be herein set forth at any greater length than may be necessary to show the manner in which they combine with the several new features of my invention. Thus, it may be stated generally, that the rack 43 is swung upon the carriage on pivots $43^s$, $43^s$, and is controlled in its movements by a rack guide 34 connected to the machine frame by pivots $72^d$ adjacent to the dog rocker, and between the pivots $72^c$ of the latter and of the rack. The rack guide is normally held in its rearward position by a rack guide spring 37, so that the rack is normally in the position shown in Figs. 2 and 4, in engagement with the dog 30. The rocker 28 has a pin 33 projecting from one side, adapted, when the rocker has been swung on its pivots 72ᶜ to a predetermined extent by the depression of a key, to contact with the base of an open slot in the rack guide, whereby the rack guide will be moved inwardly together with the dog rocker, so that the dogs and rack will move together. The pin 33 is so positioned, however, that it does not impart movement to the rack guide until the dog rocker has been moved sufficiently to disengage the dog 30 from the rack and to engage the dog 31 therewith. This operation of the parts is shown in Fig. 5. Owing to the relative position of the pivots on the dog rocker and rack guide, their contacting parts etc., the rack will then be given a more rapid movement than the dogs, so that it will be caused by the pin pressing against the rack guide, to run partially off the dog 31 and onto the dog 30, the latter dog entering into the rack at the proper tooth to permit single or double spacing according to the key that has been depressed, as before described. Upon the release of the key the rocker 28 is swung back to its initial position by the spring 38, and the rack to its initial position by the spring 37, the dog 31 being thus disengaged from the rack and all the parts being restored to the same relative positions as before the stroke on the key, with the rack held by the dog 30 which has fully entered therein and has engaged therewith a tooth one or more spaces back of that with which it was first in engagement.

As above pointed out, the swinging rack shown in the double spacing escapement herein is a type of the transversely movable member shown and described in my said prior patents Nos. 554,874, and 580,281. A novel feature of my invention herein is the guide for controlling such transversely movable member in its proper position for engagement with the spacing member;—the guide shown herein being an independent part of the escapement mechanism, instead of the driving points upon the dog rocker, which are shown in my said prior patents. While I have, therefore, only shown one form of transversely movable spaced member, since such transversely movable member, broadly speaking, forms no part of my present invention, it will be understood that I do not intend to limit myself to the use, in combination with my independent guides, of any particular style of transversely movable spaced member, or of any particular method of mounting the spaced member for its transverse movement.

As above stated, I can, by the suppression of certain features above described, as forming parts of my double spacing escapement, construct a simple escapement designed for single spacing. Thus the pivot joint 72 may be dispensed with, and, as the rack does not need to be positioned for single spacing, the rack only feeding one space at a time, the rack may be mounted on the carriage in the ordinary manner.

This form of my invention is fully disclosed in the double spacing escapement before described, but I have also shown it in Figs. 2ª, 2ᵇ, 8ª and 8 to 14, inclusive, of the accompanying drawings.

As shown in these figures the normally engaging dog 30ᶜ is pivoted, and the normally disengaged dog 31ª rigidly secured directly upon the top of the dog rocker 28ª. (See Fig. 8ª.) The disengaging and engaging action of the escapement with the non-swinging rack is, however, different from that of the swinging rack, for, while with the latter construction the escapement members are so moved as to both disengage the normally engaged dog on a partial depression and to then start its reëngagement on the full depression of the key, with the non-swinging rack form the normally engaged members are only disengaged, the usually disengaged dog being driven deeper into the rack the farther the key is depressed and the reëngagement of the normally engaged dog being effected entirely during the return of the key, as is usual in the "ordinary escapement."

In my Patent 554,874, hereinbefore referred to, I have shown an escapement wherein a beveled or inclined face is employed to control the movement in the line of the feed of the dog with which the rack is being engaged prior to the printing, and thus to control the position and movement of the rack at such times, the parts being so adjusted that if a quick or staccato blow is struck on the key, the carriage will not be retracted, whereas if a slow or legato blow is struck, so that the carriage has time to space forward through a greater distance before the impact of the type, than if a staccato blow had been struck, the carriage will be cammed back or retracted sufficiently to properly position it for the imprint on the paper, and I have in my said patent broadly claimed this said invention. I have also in my said prior Patent No. 580,281, shown a mechanism in which this camming back is effected under like conditions by means of engaging parts which act upon and control the movement of the dog with which the rack is being engaged prior to the printing. In each of these two patents, however, it will be seen that the engaging faces that control the movement of the dog which engages with the rack prior to the printing, as aforesaid, are outside of the engaging parts of the escapement itself, (i. e. the rack and dog) and act to move the rack rearwardly only by moving a pivoted dog rearwardly, necessitating the movement, both of the spaced part and of the spacing part of the escapement in the line of feed. In both the single spacing and double spacing escapements here shown, I may use an inclined or beveled face, such as is shown in my said Patent 554,874, for controlling the feed of the spaced member of the escapement, as will be hereinafter described, placing it between the two members of the escapement, upon the parts which are being engaged prior to or at the instant of printing, whereby the movement of the spaced part in its line of feed is controlled without movement of the spacing part in the line of feed. This, as it permits the use of a rigid beveled dog or rack tooth, simplifies the escapement. I will first describe my present means for controlling and feeding the carriage, in connection with my single spacing escapement; although it will be obvious that such means are also applicable to the double spacing escapement. I, however, as will be seen, show a slightly different beveling as applied to the last named form, but the two styles of beveling are interchangeable and either may be used with either form of escapement.

Such a beveled or inclined carriage controlling face may be placed on either or both of the escapement members, although the latter is preferable, as it permits the use of parallel engaging faces between the parts, which quicken the speed of the feeding movement, reduce the wear and increase the ease of working the escapement; and I have accordingly shown both the holding face 31$^b$ of the dog 31$^a$, and also the edges 43$^c$ of the rack teeth that engage therewith beveled in parallelism on the sides opposing the forward feed of the carriage. But for simplicity I will in the description of the action of a beveled face in the escapement refer in the first instance only to the beveled holding or rack controlling face 31$^b$ of dog 31$^a$.

By a "beveled" or "inclined" carriage controlling face I mean a face located obliquely to the direction of the feeding movement of the spaced member of the escapement, or obliquely to the line of movement of the spacing member for effecting the engagement of the face with the other member and its disengagement therefrom, whereby the part of the face in engagement with the other member will be located at successive intervals of the engagement at different points relatively to the line of feed of the spaced member, so that the position of the spaced member will be varied as the said face is more or less fully engaged. This inclination or beveling of one or both engaging parts permits the spaced member to be advanced in the line of its feed for printing while the disengagement of the parts is taking place; and such inclination or beveling may also be instrumental in effecting many other important functions, as for example the restoration of the working parts to their normal positions by aid of the carriage propelling power as hereinbefore set forth. Of course, rounded or curved inclined faces are the equivalents of plane beveled faces.

Referring to Fig. 2$^a$, it will be seen that I place a beveled carriage controlling face 31$^b$ on that side of the dog 31$^a$ that opposes the forward movement of the rack and on that edge thereof which is adjacent to the dog 30$^c$.

When the parts are in their normal position of rest, the rack is held by the controlling face of the pivoted dog 30$^c$. Upon the depression of a key, the dog rocker 28$^a$ is moved to the left in Fig. 2$^a$, disengaging the dog 30$^c$, and engaging the dog 31$^a$, the rack now resting on the beveled face 31$^b$ of the last named dog, it having been fed slightly forward owing to the staggering of the two dogs. Before assuming the position last stated, the parts pass through an intermediate transitory position, so that on the partial depression of a key, (say $\frac{2}{3}$), the dog 30$^c$ escapes from the rack tooth 43$^b$, but as the rack has not had time to feed forward a sufficient distance, it is out of engagement with both the dogs, and remains in this position until the movement of the rack under the influence of the carriage spring, combined with the transverse movement of the beveled face 31$^b$, causes it to contact with the dog 31$^a$.

The beveled carriage controlling face 31$^b$ of the dog, and the carriage controlling faces 43$^c$ of the rack teeth with which face 31$^b$ engages, and which are beveled in parallelism therewith, constitute a means for effecting a quick movement of the rack in the line of feed after the disengagement of the dog 30$^c$, as well as for disengaging dog 31$^a$ from the rack and reëngaging dog 30$^c$ therewith, and for lifting the keys and pulling down the type-bars, by aid of the main spring, as will be now described.

Upon the return of the keys to normal position after their release, it will be seen that the beveled face 31$^b$ of the dog 31$^a$ is withdrawn from the rack tooth, and that this permits the rack to feed forward. The feeding movement of the rack therefore starts upon the commencement of the disengagement of the dog 31$^a$ and the rack, which is simultaneous with the release of the keys. The initial feed of the rack being effected by the beveling of the dog, it is obviously under control of the dog, and depends upon the movement of the latter. While the rack is being held by the beveled face 31$^b$ on the rigid dog 31$^a$, against the pull of the main spring, it will be obvious that the main spring acts through the beveled face to throw the dog out of the rack and to thus return the dog rocker 28$^a$ and key levers to normal position. As this tendency of the main spring only exists during the period the rack is in engagement with the dog 31ª, which, generally speaking, begins about the instant of printing, the additional upward pull thus given to the key-lever must be overcome by the operator if he desires to hold the key down, or to depress it still farther; and the main spring thus serves not only to notify him that the key has been sufficiently depressed, but to automatically lift his fingers. This automatic repulsion of the fingers by the pull of the main spring at the proper time I have fully described in my said prior Patent No. 580,281, and my other prior Patent No. 616,840, dated December 27th, 1898, and I have also broadly claimed a "repulser" in my other said Patent No. 577,982, and therefore, this feature of my present invention needs no further description. As the type-bars are connected to the levers they will be started violently away from the paper by the quick return of the key levers, effected as above described by the strong pull of the main spring coming into effect at the proper time, and will thus be prevented from rebounding or blurring the print. This action of the main spring in returning the type is also shown and claimed in said prior Patent No. 580,281, and therefore, such repulsion of the key levers, and return of the escapement parts and type-bars, is only claimed herein in connection with the location or character of the beveled faces through which the pull is transmitted. As in the construction, here shown however, the pull of the main spring is only transmitted to the key levers and type-bars when the former are depressed, I provide additional means for holding the type-bars under tension in their normal positions in the type-basket (not shown) and to assist to return them thereto. These means may either consist of the key-lever springs of well known construction, or the spring 41 of the double spacing escapement (see Fig. 2), for the double-spacing keys, and the spring 42 for the single spacing keys, the latter spring supporting a cross-bar located under, and contacting with teats placed only upon the single spacing key-levers, whereby the touch upon the several keys is equalized.

It will be noticed that these additional means for holding the type-bars in the basket and preventing the rebound thereof are entirely independent of (although supplemental to) the carriage main spring or other spring mechanism tending to return the escapement parts to their normal positions.

The carriage controlling faces 43ᶜ of the rack teeth 43ᵇ which engage with dog 31ª are beveled in parallelism with the beveled carriage controlling face 31ᵇ of the dog.

By the term "beveled in parallelism" as applied to the engaging faces of the escapement, I of course do not wish to limit myself to inclined controlling faces in the two members which are strictly parallel with each other, but I intend to include faces having an inclination in the same general direction, whereby the two faces assist each other and act in conjunction to effect the quick feeding movement and retraction of the spaced member.

The rack 43ᵇ is provided with two series of controlling faces upon the side opposing the forward feeding movement of the carriage, viz: the beveled faces 43ᶜ which engage with the correspondingly beveled dog face 31ᵇ, and the faces 43ᵈ, the latter faces being unbeveled, or in planes at right angles to the line of feed, and engaging with the correspondingly unbeveled controlling face 30ᵇ of dog 30ᶜ. These two series of controlling faces on the rack teeth constitute in effect two series of ratchet teeth, and, although both series are upon a single rack bar, I consider them as being two separate parts or elements in one member of the escapement which alternately engage with the other member; and in a similar manner I consider the two dogs 30ᶜ and 31ª to be two parts or elements in one member which alternately engage with the other member. In addition to beveling the controlling faces 43ᵈ and 31ᵇ of the rack and dog, I also bevel the rear faces of both rack and dogs oppositely, as described in my said former Patent No. 580,281, such beveling enabling the dogs to more freely enter the rack teeth without danger of abutting on the sides of the teeth, as is fully described in my said former patent.

The spring 71 is mounted upon the dog rocker 28ª, being fastened thereto by screw 71ª, and pressing against dog 30ᶜ holds the dog normally in contact with limiting pin 70, which is inserted in the top of the dog rocker. Dog 30ᶜ is thus spring pressed toward dog 31ª and can yield on its pivot 30ª during its re-engagement with the rack, while dog 31ª is being disengaged, as was previously described in connection with the double spacing escapement. The limiting pin 70 is so positioned on the rocker that the open space between the edges of the two dogs, adjacent to each other, is a little narrower than the width of the rack so as to insure that the dog which is being moved into engagement with the rack shall be safely positioned in the path of the rack before the other dog is disengaged therefrom, and at the same time to permit of a quick exchange in the meshing of the dogs with the rack, such adjustment of the width of the space between the dogs being well known.

As was stated above, the beveling in the double spacing escapement is somewhat different. The parts being in the normal position shown in Figs. 2 and 4, the rack 43 is held by the dog 30, its carriage controlling face 43ᵉ resting upon the carriage controlling face of the part 30ᵈ of the dog, the controlling face of both dog and rack being slightly beveled in parallelism with each other. When a key is depressed the dog carrying rocker 28 is swung inwardly, and the rack 43 being now held against swinging therewith, by the spring 37 of the rack guide 34, runs down the slightly beveled face of the part 30ᵈ, which thus reduces the friction attendant upon the initial depression of a key. The beveling, however, with the form of my invention shown herein, should preferably not be sufficiently great ordinarily to effect a substantial part of the letter space feed, as otherwise it would tend to swing the rocker frame inwardly, and to thus disengage the normally engaging members, or to require the use of an unduly strong rocker controlling spring 38 to retain the members of the escapement in their normal positions. Where the highest speed is desirable, however, the carriage controlling faces of the dog 30 and of the rack teeth which engage therewith, or either, may if desired be materially beveled (as for instance to a degree equal to that of the controlling faces of the other dog and rack teeth); under which circumstances, owing to the staggering of the dogs relatively to each other, the carriage will perform part of its material feeding movement prior to and part after the printing.

As soon as the key has been depressed sufficiently to fully disengage dog 30 from the rack, the rack is free to advance in the line of feed until caught and checked by the controlling face 31ᶜ of dog 31. In order to insure the proper intermeshing of the two dogs with the rack, to effect the letter spacing of the rack under all conditions and at the highest speed, I have, in addition to beveling the engaging faces between the members, connected the rack with the carriage in such a manner that the rack will feed with the carriage and also relatively thereto in the line of feed at a rate of speed higher than the rate at which the carriage feeds and such means for feeding the rack with the carriage and relatively thereto in the line of feed are also equally as applicable with the single spacing escapement as with the double spacing escapement, but I will describe it particularly in connection with the latter.

The rack is journaled upon the carriage by pivots 43ᵍ, 43ᵍ, and is arranged and adjusted so that it can move endwise on its bearings in the carriage, through a distance equal to that of about one letter space. It is pressed to the limit of its movement to the right (that is to say, in the same direction as the carriage feeds) by the rack spacing spring 32, when the rack is released from the control of the dogs 30 and 31. But, since, spring 32 is weaker than the carriage main spring, it is overcome thereby when the rack is in engagement with either of the dogs, the carriage being drawn forward in the line of feed while the rack is held by the dogs from advancing, so that the rack is normally held by the main spring at the limit of its movement to the left of the carriage, as is shown in Fig. 3. Upon the depression of a key, as soon as the key has been depressed far enough to fully disengage the normally engaged dog 30 from the rack, the rack will be fed forward with the carriage by the mainspring. But the rack not only feeds with the carriage, under the influence of the main spring, but it also advances relatively to the carriage under the influence of its spacing spring 32, which is free to impel it toward the right in the carriage while the carriage is feeding, so that the rack feeds at a higher rate of speed that the carriage. At this part of the movement the rack is prevented from swinging inwardly by rack guide 34 and rack guide spring 37, and consequently, since the rack is advancing and the dogs swinging inwardly, the beveled rack face 43ᶠ will contact with the beveled dog face 31ᶜ, and be arrested thereby, and will then, in case the key is further depressed, start swinging inwardly and again feed. It is also obvious that during such movement of the rack, the carriage will continue to feed forward, propelled by the main spring, until the carriage shall have overtaken the rack.

The advantage of the construction now under consideration over the non-swinging rack of the single spacing escapement, previously described, is that the teeth of the rack which engage with the dogs will advance at a much higher rate after the release of a depressed key than they would if feeding at the same speed that the carriage does; and thus the danger of a dog reëntering the tooth it has escaped from or of colliding with the side of the next succeeding rack tooth, is lessened just in proportion to the higher rate that the rack teeth feed over that of the moving carriage.

This advantage is particularly important in an escapement having a normally disengaged impulse feeding dog, such as those shown herein or in my prior patents hereinbefore referred to.

It will be understood from the above that where I use the term in the claims, "means for feeding the spaced member with the carriage and relatively thereto at a higher rate of speed," I refer to the faces in the spaced member which engage with the spacing member of the escapement, since it is such engaging faces that must feed at a high rate of speed to avoid butting in the engaging and disengaging movements. I believe myself to be broadly the first to have invented an escapement provided with a toothed spaced member and a spacing member having teeth adapted to engage those of the spaced member, and in which means are provided operated by the carriage propelling power for feeding the engaging teeth of the spaced member with the carriage and relatively thereto under control of the spacing member at a rate of speed higher than that at which the carriage feeds after the release of a depressed key and while the key and its printing member are returning to their normal positions, in combination with an impulse element on one of the escapement members on which the carriage propelling power acts to aid in restoring the key, printing member and escapement to their normal positions; the combination of the impulse element and relatively rapid feeding rack teeth constituting an important improvement over the combination of an impulse element and spaced member having teeth which feed at the same rate as that of the moving carriage. In this improvement the essential thing of course is that the engaging rack teeth (i. e.—the dog engaging points of the teeth) feed at the relatively high rate of speed, and it is immaterial whether or not other parts of the spaced member feed at the same high speed, for it is the engaging teeth only that must be rapidly and accurately positioned for the reëngagement of the dogs and which must be rapidly advanced to cause the engaging faces of the rack teeth to press constantly and firmly against the inclined face of the dog, whereby the carriage propelling power will be maintained effective in rapid writing, to aid in the restoration of the key, printing member and escapement to their normal positions after the release of a depressed key and while the carriage is performing its feeding movement. Thus in the form of escapement that is illustrated in Fig. 7, one element of the spaced member is the lever 32$^a$ which is attached to the carriage at 32$^c$ and which is attached at 32$^d$ to the element of the spaced member that carries the relatively rapid feeding escapement teeth; so that lever 32$^a$ feeds at 32$^c$ at the same rate as the moving carriage and at 32$^d$ at the same rate as the dog engaging rack teeth, and at proportionately varying rates of speed at all points between 32$^c$ and 32$^d$; the escapement of Fig. 7 thus comprising all the advantages of the improvement in question, although some parts of the spaced member, other than the engaging teeth thereof, do not feed at any higher rate of speed than that of the moving carriage.

As before stated, upon the partial depression of a key the parts assume a transitory position in which the rack is in contact with neither dog, but is advancing to contact with the dog 31$^a$.

Continued depression of the key will bring the parts to the position shown in Fig. 5, in which the rocker 28 has been swung inwardly far enough so that the pin 33 on the rocker has contacted with the bottom of the slot in the rack guide 34 and started the rack guide swinging inwardly (the dogs and rack now swinging inwardly together as is indicated by the two arrows in Fig. 4, both pointing downward). Owing to the fact that the slot in the rack guide 34 is nearer to the rack guide pivots 72$^d$ than the distance from the pivots 72$^c$ of the rocker 28 to the pin 33, the rack will now move inwardly faster than the dogs. The rack in this movement will run down the beveled face 31$^c$, upon the dog 31, and will thus be permitted to move forward, the type striking the paper about this time. But as the rack is spacing under the control of the dog 31, its beveled controlling face 43$^f$ being held by the beveled dog face 31$^c$, and by the key by which the dog 31 is moved, the carriage is held under the control of the key and blurring prevented. When the key is depressed the rack will be in engagement with the dog 31, not having been entirely disengaged therefrom, but the dog 30 will also be located in the path of the rack teeth in position to arrest its movement.

While the rack is thus being swung inwardly against the tension of its spring 37 to effect its disengagement, to a greater or less extent from the dog 31 and to permit its spacing by the pull of the main spring, the latter acts upon the face 31$^c$ of the dog 31 to return the rocker frame and parts connected therewith to normal position and to thus repulse the fingers of the operator. This repulsive action is further increased by the tension under which the rack guide spring 37 has been placed by the swinging rack. Thus, in this operation of the escapement, not only is there present the repulsion of the fingers, by means of the main spring claimed and described in my said Patent No. 580,281, but also by a separate spring as is especially shown in my said Patent No. 577,982.

I have shown the dog rocker pivots 72$^c$ and pin 33 so arranged and disposed relatively to rack guide pivots 72$^a$, as to cause the rack to swing inwardly faster than the rocker and dogs. But I do not wish to limit myself to driving the rack transversely faster than the dogs. By swinging the rack inward faster than the dogs, however, in conjunction with means for locking it in its inward position, which latter means will now be described, I effect an important function, viz: the controlling of dog 30 in the rack tooth with which it has been engaged for double spacing until such spacing is assured.

In double spacing, as hereinbefore described, dog 30 is first disengaged from the rack and spaced backward by means of the keys aided by wire 40 in opposition to dog spring 41, and then the rack is swung over by pin 33 and the rack guide onto the dog, thus engaging the dog with the second tooth back on the rack. But since pin 33 drives the rack faster than the dog by contacting with the rack guide 34 near its pivot $72^d$, during the depression of the keys, thus throwing the rack over onto the dog 30, it is obvious that, if means were not provided to prevent it, upon release of the keys, the pin 33, coming away from the rack guide, would permit rack guide spring 37 to swing the rack outward again faster than the dogs, so that the rack would be again disengaged from the dog 30, during the return of the parts to normal position. It is also obvious that dog 30, if disengaged from the rack during the return of the parts to normal position, would be spaced forward by spring 41 from its double spacing position into the single spacing position; and that then, after the rack had finished its outward vibration, dog 30, still swinging outward, would reënter the rack, but in the first tooth back instead of in the second tooth back from the one from which it had escaped during the depression of the key. I overcome the above described difficulty in double spacing, first, as previously stated, by swinging the rack inward faster than the dogs so as to cause dog 30, after it has been spaced backward, to reënter the rack in the second tooth back of the one from which it had escaped, and secondly by then locking the rack in its inward position until the double spacing is assured. My means for locking the rack inward and for unlocking it are as follows:

Pivoted upon the frame work of the machine is a latch 35 provided at its free end with a hook $35^a$ which is adapted to engage with the rack guide 34, when the rack guide is swung inwardly, and to thereby lock the rack guide and rack inwardly on the machine. A spring $35^c$ constantly presses the latch in the direction for moving hook $35^a$ into the path of the rack guide, but normally spring $35^c$ is neutralized and hook $35^a$ is held out of the path of the rack guide by the projection 36 upon the upper part $36^d$ of dog 30. When dog 30 is vi'"ated on its pivot 72 for double spacing, however, the projection 36 is moved away from latch 35, which then locks the rack inward. Hence it will be seen that the rack is locked inward in double spacing but not in single spacing. Upon the release of a double spacing key, the dog 30 is drawn forward with the rack by the main spring, thereby causing the projection 36 to move latch 35 out of the path of the rack guide, thus unlocking the rack after double spacing is assured. A second or outer hook $35^b$, still remaining in the path of the rack guide, limits the outward vibration thereof and determines the normal position of the rack.

Since printing can be effected by a partial depression of the keys, and since the rack guide is only locked by the full depression of the keys, it is obvious that the staccato blow may be used in single or letter spacing and that the legato blow should be practiced to insure double or word spacing. After the release of a double space key when the rack guide is unlocked by the forward feed of the rack, the rack swings outwardly with the dog rocker.

As I have before stated, I have in my Patent 580,281, shown the beveling of the non-engaging or rear faces of the rack teeth and dogs, and I desire to herein claim the beveling of such faces when combined with the beveling of the engaging faces described herein, for by this construction I am enabled to bevel the dogs at a sharper angle, thus allowing the dogs to enter the rack more quickly and more freely without danger of collision with the rear faces of the teeth of the latter; and without weakening the teeth and dogs by thin tapering edges.

In Figs. 1, 2 and 3, I have also as above described provided a relatively quick moving rack and in Fig. 7 I show another mechanism for feeding the rack at a rate of speed higher than that at which the carriage feeds under the pull of the carriage propelling power. The rack is journaled in the rack frame $43^i$ to reciprocate endwise therein upon its journals $43^j$, its endwise movement in the carriage being limited in one direction by the abutment $43^k$ of the rack frame, and at the other end by the abutment $43^l$. The reciprocating bar $32^a$ is pivoted upon the carriage at the end $32^c$ and is connected with the rack at the end $32^d$. At a point $32^e$ upon the bar intermediate between the two ends thereof the bar is connected with the carriage propelling power by means of band $32^b$, the said propelling power consisting of a main spring coiled up and held under tension in main spring barrel $32^f$ and constantly tending to draw the carriage forward, or to the right in Fig. 7.

As shown in the drawing the point of connection of the bar with the band $32^b$ is about one third of the length of the bar away from the end $32^c$ thereof, and two thirds of the length of the bar distant from the rack connecting end $32^d$ thereof; so that, when the rack is being fed relatively to the carriage by the propelling power, two thirds of the force of the propelling power is exerted upon the carriage to advance the carriage and one third of said force is exerted upon the rack to advance the rack.

It is also to be noted that the rack is of small weight relative to the carriage. With the escapement parts in their normal position, the carriage is drawn by the mainspring in its line of feed until the abutment 43$^k$ contacts with the end of the rack. Upon the rack being released by the escapement for any movement in the direction of its feed, the rack and carriage will be fed forward by the main spring with relative speeds depending upon their inertia and the power of the spring respectively exerted thereon through the bars. This results in the rack moving when released, in the line of feed faster than the carriage, while after the rack is arrested by the escapement the carriage continues its movement until the abutment 43$^k$ contacts with the rack, as before described.

If the escapement be provided with a beveled holding face, such as is shown on the normally disengaged dog herein, the rack can feed forward as fast as the beveled holding face of the dog is withdrawn from its path of movement, and at a rate proportional to the steepness of the beveling on the holding face of the dog, the carriage meantime feeding forward as rapidly as its inertia can be overcome by the pull of the main spring thereon.

While the relatively quick moving rack of Figs. 1, 2, and 3 differs structurally from that of Fig. 7, the statements above made as to the mode of operation of rack 43$^h$ of Fig. 7 applies generally to the rack 43 of Figs. 1, 2, and 3; with the distinction that in Fig. 7 the carriage is moved and the rack is moved therewith and relatively thereto by the mainspring, while in Figs. 1, 2, and 3 the rack and carriage are moved together by the main spring and the rack is moved relatively to the carriage by its spacing spring 32.

Referring particularly to Figs. 1, 2 and 3, the carriage rests on the shifting guide rails 62 and 63, which are pivotally mounted respectively at the front and the rear of the machine. The front rail 62 is mounted on the rocker arms 65 and 65$^a$. The rocker arm 65$^a$ has two branches at the lower extremity, one 65$^b$, extending toward the front, and the other 65$^c$ extending toward the rear of the machine. To the front end of the forwardly extending arm 65$^b$ is attached spring 66, which holds the carriage normally forward in position for printing lower case characters, and to the hind end of the rearwardly extending branch 65$^c$ is attached the connecting wire 67, which is fastened at its lower end to the shift key lever. The rear rail is mounted on rocker arms 63$^a$, 63$^a$ at the rear of the machine. Extending between the front and rear arms are the connecting rods 68, 68. When the shift key 11 is depressed the front guide rail 62 is rocked rearwardly, and the motion is transmitted to the rear guide rail 63 through the connecting rods 68, 68. The carriage is thus shifted rearwardly into position for printing upper case characters. But since the engaging teeth of the rack 43 are meanwhile held against rearward movement by rack guide 34, it is obvious that my construction is one wherein the carriage can be shifted as a whole upon its bearings and running gear from lower case printing position to upper case printing position, and vice versa, without any corresponding movement of the spaced member; and that I have provided means to control the spaced member and prevent transverse movement thereof during the shifting movement of the carriage from one case to another. I do not wish to limit myself narrowly in this part of my invention to the precise construction shown herein, since I have in my said Patents Nos. 554,874, and 580,281 and 616,840, shown a variety of means for connecting the spaced member with the carriage for transverse movement of the one relatively to the other, all of which can evidently be employed to prevent transverse movement of the spaced member during the shifting movement of the carriage; and I wish to have it understood that I claim broadly herein a carriage which is shifted with its running gear, upon rails or tracks, in combination with a guide for the spaced member. My running gear shown herein comprises roller 62$^d$, at the front of the carriage, and the two supports 63$^b$, 63$^b$, encircling rail 63 at the rear end of the carriage.

Near the left hand end of the rack (Fig. 1) is the arm 43$^a$, which extends over the guide rail 63 and is then bent downwardly until its front end lies only slightly above the top plate of the machine. Pivoted to the left hand side of the carriage frame is the release lever 61, which carries on its front end the release key 60 and has its rear end so placed that when the release key is depressed the rear end will engage with the rack arm 43$^a$ and rock the rack inwardly out of engagement from dog 30. When the carriage is lifted for inspection of the writing, however, the release lever does not engage with the rack arm.

The rack may also be lifted out of engagement with the dog by tilting up the rear end of the rack frame, as is customary with the Remington construction when the end of a line has been reached and before returning the carriage to the starting point for a new line. This is done when the platen is revolved by the line space lever (not shown), in order to avoid the clicking sound and the wear in the escapement which occurs when the carriage is returned to the starting point by tripping the dogs out of the rack.

Mounted on the left hand end of the frame of the carriage is the rack stop 64, which is for preventing the rack from spacing forward upon the carriage when it is lifted out of engagement from dog 30 by the line space lever, or when it swung sidewise out of engagement from dog 30 by the release lever 61. The stop 64 is pivoted upon the side of the rack frame 43$^m$, and is provided with a rearwardly and a forwardly extending branch. The forwardly extending branch is the heavier and, therefore, tends to drop down. It rests upon the top of the carriage sleeve which encircles the guide-rail 63, and its front end curves over and down in front of the guide rail beside the end of the rack arm 43$^a$, where it is in position to be engaged by the release lever 61 when the release key 60 is depressed.

The rearwardly extending branch of stop 64 is normally held up just out of the path of rack journal 43$^g$ by the overbalancing weight of the forwardly extending branch. When, however, the rack frame 43$^m$ is tilted up by the line space lever, to lift the rack out of engagement from dog 30, the rack journal 43$^g$ is thereby lifted, while the rearwardly extending branch of stop 64 resting on the rear of lever holds the rearwardly extending branch of the stop down, so that journal 43$^g$ is brought into obstructive position relatively to stop 64 before the disengagement of the rack from dog 30, whereby the rack is prevented by the stop from moving relatively to the carriage in the line of feed while the carriage is released from the control of the escapement. On the other hand, when the release key 60 is depressed to free the rack from dog 30, the rear end of lever 61 is thereby raised up, and engages with rack arm 43$^a$ to swing the rack inwardly free of dog 30, and, simultaneously engaging with the forwardly extending branch of stop 64, throws down the rearwardly extending branch of the stop into the path of the journal 43$^g$ before the rack is swung inwardly far enough to free the rack from dog 30, whereby the stop is brought into obstructive position relatively to the rack, and prevents movement of the rack in the line of the feed relatively to the carriage, while the carriage is released from the control of the escapement. Hence, in the one case the rack is moved into the path of the stop and in the other case the stop is moved into the path of the rack, but in both cases the spaced member and stop are brought into relatively obstructive position to prevent movement of the spaced member relatively to the carriage in the line of feed while the carriage is out of the control of the escapement.

In any case wherein the spaced member of the escapement is movable in the line of feed relatively to the carriage in the movement to effect the spacing of the carriage, it is desirable, in order to secure correct margins for the lines or columns of typewritten work, that a stop mechanism be provided, which, while not interfering with the relative movement of the spaced member, during the feeding movement of the spaced member and carriage, will accurately control the relation of the spaced member to the carriage while the spaced member is free of the spacing member, so that upon the return of the carriage into the control of the escapement the carriage will be properly positioned for beginning the line or column of writing. The mechanism by which I effect this function herein is the spring 32, of Figs. 1, 2 and 3, or reciprocating lever 32$^a$, and the carriage main spring of Fig. 7, for spacing the rack forward relatively to the carriage, and the stop 64 which prevents the relatively forward spacing of the rack while the carriage is out of the control of the escapement. I believe myself to have been the first to have invented a stop mechanism, for use in connection with a spaced member of the escapement feeding with the carriage and relatively thereto in the line of feed, which can be brought into obstructive position with the spaced member while the carriage is free of the escapement, and which can be freed from obstructive relation with the spaced member whereby the spaced member can be moved with the carriage and relatively thereto in the line of feed, and wherein the part which is moved into obstructive position is key actuated in at least one direction; and by the term "key actuated" I mean to include any mechanical equivalent of a key, as for instance the line space lever above referred to.

While I have shown the several features of my escapement applied to controlling, through the medium of a straight rack, the feed of a paper carriage, (and in the claims I use the term "rack" as a generic expression to cover any form thereof,) it is obvious that instead of the paper carriage shown herein, I may use a movable type carriage (and in the claims I use the term "carriage" as a generic expression to cover any form of carriage carrying either one of the printing couple; i. e. either the type or the platen); and it is obvious that instead of mounting the dog rocker on the machine frame, and the rack on the carriage, the position of the parts may be reversed and the rack mounted on the machine and the dog rocker on the carriage, both modifications being shown in said Patent #580,281, (and in the claims I use the terms "spaced member" and "spacing member" as indicating broadly the moving member and the member by which its movement is controlled, (irrespective of which of the above specified parts is moved with the carriage.)

In the claims I will use the term "carriage holding face" as designating a face in the escapement which holds the moving member thereof against spacing at the instant of or prior to the printing. As, however, the timing of the parts varies with different blows on the keys, I do not limit myself by the above term to a face which is always in engagement at the instant specified, but include thereby a face which is adapted by any one particular blow to be so engaged. By the term "carriage controlling face" I intend to designate a face which controls the feeding movement of the spaced member so long as such face remains in engagement with the other member.

It will be obvious that my invention is of wide application, and I therefore do not intend to limit myself to the precise details shown herein.

In Patent 805,956, issued to me Nov. 28, 1905, as a division of this application, I have shown and described a single spacing escapement embodying the construction and arrangement shown in Figs. 2ª and 2ᵇ, and 8 to 14 hereof, but I have in that patent claimed such an escapement only when having a square or unbeveled normally engaged face. In this application therefore, I do not claim a single spacing escapement when provided with a square or unbeveled normally engaged face specifically, but I do claim in certain generic claims herein an escapement irrespective of the character of the normally engaged face, whether it be beveled (or inclined) or unbeveled (or square), having reserved in that patent the right to make such claims in this application.

In certain of the claims herein I employ terms such as "repulsion beveled dog," "repulsion beveled face," "repulsion working faces," "repulsive action of the main spring exerted on the beveled face," "repulsing," etc. By these terms I mean that the beveling of the engaging faces referred to is of such character that the main spring can exert its force thereon in such a manner as to disengage the repulsion beveled face from the other member, and perform other related functions such as lifting the key and throwing back the type bar from the printing position, etc. That is to say the face is so inclined as to resolve the thrust of the main spring into a component effective for returning the parts toward their normal position. This arrangement and action has come to be known as "repulsion" and hence the use of such terms in the claims herein.

It will be observed that in Fig. 2ª and in Figs. 8 to 14 I have shown the normally engaged faces in the escapement as being wholly unbeveled, whereas in Figs. 4, 5 and 6 I have shown the engaging faces of the corresponding parts beveled to such a degree as to effect a quick feed of the carriage and so as to reduce the friction between the normally engaged dog and rack teeth, but not sufficiently to effect "repulsion." In the claims herein I have, in certain claims, employed the term "non-repulsion" or "non-repulsive," in designating such normally engaged faces in Figs. 2ª, 4, 5, 6 and 8 to 14. The distinction intended to be thus drawn is between engaging faces (regardless of whether they are wholly unbeveled or not) which do not effect the function of "repulsion," on the one hand, and on the other, those faces which do effect that function.

I claim:

1. In a typewriter, the combination in an escapement comprising two members, of a beveled face on each member normally out of engagement with the beveled face on the other, a printing member, and a key connected with the printing member to move it to printing position and connected with the escapement for engaging the beveled faces when the key is actuated.

2. In a writing machine escapement, comprising a rack member and a dog member which engage together, the combination of two series of teeth on that side of the rack which opposes the carriage feed, one series having faces formed in planes oblique to the planes of the other series, and the dog member comprising two dogs having their holding faces parallel with the rack teeth with which they respectively engage.

3. In a power driven writing machine having an escapement, the combination with the dog member of two series of ratchet teeth on that side of the rack member which opposes the carriage feed, one series having its faces formed in planes oblique to the planes of the faces in the other series, one series being normally disengaged and provided with repulsion beveled faces adapted to engage the normally disengaged dog and the faces of the other series being normally engaged and very slightly beveled so as to relieve the friction and to assist in starting the carriage, substantially as described.

4. In a writing machine escapement, the combination of a rack member having teeth beveled at an angle to the direction of the feed on their carriage controlling faces and beveled oppositely on their rear faces so as to form thin edges to the teeth, and a dog engaging therewith and beveled in parallelism with the rack teeth, substantially as described.

5. In a writing machine escapement, the combination of a rack member having teeth on one side of the rack beveled at an angle to the direction of the feed on their carriage controlling faces and beveled oppositely on their rear faces so as to present thin edges at the side of the rack, and a dog which engages with the rack on the beveled side and which is beveled in parallelism with the rack, substantially as described.

6. In a writing machine, the combination with a key and a printing member, of a power driven carriage and an escapement therefor comprising a spacing member and a spaced member, an inclined carriage controlling face on one of the members which is normally out of engagement with the other member but which is adapted to engage therewith, mechanism operated by the carriage propelling power for feeding the engaging teeth of the spaced member with the carriage and relatively thereto at a rate of speed higher than that at which the carriage feeds after the release of the operating key and while the said inclined face is engaged with the said other member, a connection between the key and the escapement for engaging the inclined face with the other member upon a partial depression of the key, and a connection between the key and the printing member to operate the printing member for printing upon a further depression of the key after the inclined face has been engaged with the other member, substantially as described.

7. In a writing machine, the combination with a printing member, of a power driven carriage and an escapement therefor comprising a spacing member and a spaced member, an inclined carriage controlling face on one of the members which is normally out of engagement with the other member, mechanism operated by the carriage propelling power for feeding the engaging teeth of the spaced member with the carriage and relatively thereto at a rate of speed higher than that at which the carriage feeds after the release of the operating key and while the said inclined face is engaged with the said other member, and a key connected with the escapement for engaging the inclined face with the other member upon a partial depression of the key and connected with the printing member to operate it for printing upon further depression of the key, substantially as described.

8. In a writing machine, the combination of a rack which reciprocates relatively to the carriage in the line of the carriage feed, and a vibratory rocker having a dog which engages with the rack and a pivoted or flexible dog which also engages with the rack and which can yield on its pivot on entering the rack while the first mentioned dog is being withdrawn, substantially as described.

9. In a writing machine, the combination with a power driven carriage, of an escapement to control the feed thereof comprising a spaced member having teeth which move with the carriage and relatively thereto in the line of feed, a stop, means for disengaging the escapement from the carriage and for bringing the spaced member and the stop into relatively obstructive position whereby said relative movement of the spaced member in the line of feed is controlled when the carriage is released from the escapement, substantially as described.

10. In a writing machine, the combination with a power driven carriage, of a rack having teeth which move with the carriage and relatively thereto in the line of feed, a stop, means for automatically bringing the rack and the stop into relatively obstructive position, whereby said relative movement of the rack in the line of feed is prevented when the carriage is released from the escapement, and a key and means operated thereby for actuating one of the parts in at least one direction and thereby releasing the carriage from the escapement, substantially as described.

11. In a writing machine, the combination with a power driven carriage, of an escapement to control the feed thereof comprising a spaced member mounted on the carriage and having teeth movable relatively to the carriage in the line of feed, means for releasing the carriage from the escapement, and a stop mounted on the carriage which can be interposed in the path of the spaced member to control said relative movement when the carriage is released from the escapement, substantially as described.

12. In a writing machine, the combination with a power driven carriage, of an escapement comprising a spaced member having teeth which move with the carriage and relatively thereto in the line of feed, a stop for checking said relative movement when the carriage is released from the escapement, which stop is normally out of the path of the spaced member, and a key and means operated thereby for bringing the spaced member and the stop into relatively obstructive position, and for releasing the carriage from the escapement, substantially as described.

13. In a writing machine, the combination with a power driven carriage, of an escapement comprising a spaced member mounted on the carriage and having teeth movable relatively to the carriage in the line of feed, a stop mounted on the carriage to check said relative movement when the carriage is released from the escapement, which stop is normally out of the path of the spaced member, and a key and means operated thereby for bringing the spaced member and the stop into relatively obstructive position, and for releasing the carriage from the escapement, substantially as described.

14. In a writing machine, the combination with a power driven carriage, of an escapement to control the feed thereof comprising a toothed spacing member and a spaced member having teeth arranged to engage those of the spacing member, and which feed with the carriage and relatively thereto, a stop which is normally out of the path of the spaced member, means for releasing the carriage from control of the escapement and for simultaneously bringing the spaced member and the stop into relatively obstructive position to prevent said relative movement of the said engaging teeth of the spaced member while the carriage is out of control of the escapement, substantially as described.

15. In a writing machine escapement, the combination with a power propelled carriage and the propelling power therefor, of a spaced member and a spacing member which engage together, one of the members having a normally engaged part and a normally disengaged one, a key and connections for disengaging the normally engaged part from the other member and for engaging the normally disengaged one therewith, mechanism operated by the carriage propelling power for feeding the engaging teeth of the spaced member with the carriage and relatively thereto at a rate of speed higher than that at which the carriage feeds after the release of the operating key and while the normally disengaged part is engaged with the said other members, and means operated by the carriage propelling power for reëngaging the normally engaged part with said other member, substantially as described.

16. In a writing machine escapement, the combination with a power propelled carriage and the propelling power therefor, of a spaced member and a spacing member which engage together, one of the members having a normally engaged part and a normally disengaged one, a key and connections for disengaging the normally engaged part from the other member and for engaging the normally disengaged one therewith, mechanism operated by the carriage propelling power for feeding the engaging teeth of the spaced member with the carriage and relatively thereto at a rate of speed higher than that at which the carriage feeds after the release of the operating key and while the normally disengaged part is engaged with said other member, and means operated by the carriage propelling power for disengaging the normally disengaged part from said other member, substantially as described.

17. In a writing machine escapement, the combination with a power propelled carriage, the propelling power therefor and the keys, of a toothed spaced member and a spacing member having teeth adapted to engage those of the spaced member, means operated by the propelling power for feeding the engaging teeth of the spaced member with the carriage and relatively thereto under control of the spacing member at a rate of speed higher than that at which the carriage feeds after the release of a depressed key and while the escapement parts are being returned to normal position, and means operated by aid of the propelling power for returning the said escapement parts to their normal positions.

18. In a writing machine escapement, the combination with a power propelled carriage, the propelling power therefor and the keys, of a toothed spaced member and a spacing member having teeth adapted to engage those of the spaced member, means operated by the propelling power for feeding the engaging teeth of the spaced member with the carriage and relatively thereto under control of the spacing member at a rate of speed higher than that at which the carriage feeds after the release of a depressed key and while the escapement parts are being returned to normal position, and an inclined carriage controlling face on one of the members which engages with the other member while the escapement parts are being returned to their normal positions, and which is operated on by the carriage propelling power to aid in restoring the said escapement parts to their normal positions.

19. In a writing machine, the combination with a power propelled carriage of an escapement therefor which comprises two engaging members, teeth in said members which normally engage together, a printing member, a key connected with the printing member to positively move it to and away from printing position and connected with the escapement for moving it in one direction, one of the escapement members having an inclined carriage controlling face thereon which is adapted to be brought into engagement with the other escapement member, and mechanism operated by the carriage propelling power for feeding the engaging teeth of the spaced member with the carriage and relatively thereto at a rate of speed higher than that at which the carriage feeds after the release of the operating key and while the said inclined face is engaged with the other member.

20. In a writing machine escapement, the combination with a power propelled carriage, the main spring therefor and the keys, of an escapement rack and a dog member engaging therewith, means operated by the main spring for feeding the engaging teeth of the rack with the carriage and relatively thereto under control of the dog member at a rate of speed higher than that at which the carriage feeds after the release of a depressed key and while the escapement parts are being returned to normal position, and means operated by aid of the main spring for returning the said escapement parts to their normal positions.

21. In a writing machine escapement, the combination with a power propelled carriage, the main spring therefor and the keys, of an escapement rack, and a dog member having teeth adapted to engage those of the rack, means operated by the main spring for feeding the engaging teeth of the rack with the carriage and relatively thereto under control of the dog member at a rate of speed higher than that at which the carriage feeds after the release of a depressed key and while the escapement parts are being returned to normal position, and an inclined carriage controlling face on one of the members which engages with the other member while the escapement parts are being returned to their normal positions, and which is operated on by the main spring to aid in restoring the said escapement parts to their normal positions.

22. In a writing machine escapement, the combination with a power propelled carriage and the main spring therefor, of an escapement rack and dog member engaged together, the dog member having a normally engaged dog and a normally disengaged one, a key and connections for disengaging the normally engaged dog from the rack and for engaging the normally disengaged dog therewith, mechanism operated by the main spring for feeding the engaging teeth of the rack with the carriage and relatively thereto at a rate of speed higher than that at which the carriage feeds after the release of the operating key and while the normally disengaged dog is engaged with the rack, and for reëngaging the normally engaged dog with the rack, substantially as described.

23. In a writing machine escapement, the combination with a power propelled carriage and the main spring therefor, of an escapement rack and a dog member which engage together, one of the members having a normally engaged dog and a normally disengaged one, a key and connections for disengaging the normally engaged dog from the rack and for engaging the normally disengaged dog therewith, mechanism operated by the main spring for feeding the engaging teeth of the rack with the carriage and relatively thereto at a rate of speed higher than that at which the carriage feeds after the release of the operating key and while the normally disengaged dog is engaged with rack and for disengaging the normally disengaged dog from the rack, substantially as described.

24. In a writing machine escapement, the combination with a power propelled carriage and the main spring therefor, of an escapement rack and dog member engaged together, the dog member having a normally engaged non-repulsion dog and a normally disengaged repulsion beveled dog, a key and connections for disengaging the normally engaged dog from the rack and for engaging the repulsion dog therewith, mechanism operated by the main spring for feeding the engaging teeth of the rack with the carriage and relatively thereto at a rate of speed higher than that at which the carriage feeds after the release of the operating key and while the repulsion dog is engaged with the rack, and for reëngaging the normally engaged dog with the rack by aid of the action of the main spring exerted upon the repulsive face of the dog.

25. In a writing machine escapement, the combination with a power propelled carriage and the main spring therefor, of an escapement rack and a dog member which engage together, one of the engaging members having a normally engaged non-repulsive dog and a normally disengaged repulsion beveled dog, a key and connections for disengaging the normally engaged dog from the rack and for engaging the repulsion dog therewith, mechanism operated by the main spring for feeding the engaging teeth of the rack with the carriage and relatively thereto at a rate of speed higher than that at which the carriage feeds after the release of the operating key and while the repulsion dog is engaged with rack and for thereby disengaging the dog from the rack by aid of the action of the main spring exerted upon the repulsive face of the dog.

26. In a typewriting machine, the combination of a key, a carriage, a main spring therefor, and an escapement comprising a dog member and a rack member, the dog member comprising a normally engaged non-repulsion dog and a normally disengaged repulsion beveled dog, and the rack member comprising two series of teeth, one series engaging the normally engaged dog and the other series being adapted to engage the normally disengaged dog, the holding faces of the one series being parallel with the working face of the normally engaged dog with which they engage and the holding faces of the other series being beveled in parallelism with the repulsion beveled face of the normally disengaged dog with which they are adapted to engage.

27. In a typewriting machine, the combination of a key, a carriage, a main spring therefor, and an escapement comprising a dog member and a rack member, the dog member comprising a normally engaged non-repulsion dog and a normally disengaged repulsion beveled dog, and the rack member comprising two series of teeth, one series engaging the normally engaged dog and the other series being adapted to engage the normally disengaged dog, the holding faces of the one series being parallel with the working face of the normally engaged dog with which they engage and the holding faces of the other series being beveled in parallelism with the repulsion beveled face of the normally disengaged dog with which they are adapted to engage, and a key and connections for disengaging the normally engaged dog from the rack and for bringing said repulsion beveled dog into engagement with one of the said beveled rack teeth, whereby the force of the main spring is brought into action upon the engaged repulsion working faces of the dog and rack tooth, to lift the depressed key.

28. In a writing machine, the combination with a power propelled carriage and a main spring therefor, of an escapement which comprises two engaging members, non-repulsive teeth in said members which normally engage together, a type bar, a key connected with the type bar to positively move it to and away from printing position and connected with the escapement for moving it in one direction, one of the escapement members having a normally disengaged repulsion beveled face thereon which is adapted to be brought into engagement with the other escapement member, connections between the key and the escapement and mechanism operated by the main spring for feeding the engaging teeth of the spaced member with the carriage and relatively thereto at a rate of speed higher than that at which the carriage feeds after the release of the operating key and while the said repulsion beveled face is engaged with the other member and for thereby aiding to quickly lift the key and start back the type bar by the repulsive action of the main spring.

29. In a writing machine escapement, the combination with the carriage and carriage main spring, of a rack member and a dog member, one of which is provided with a normally engaged non-repulsive dog having a carriage controlling face parallel with the faces of the rack teeth with which it engages and a normally disengaged dog adapted to be brought into engagement with the rack and provided with a repulsion beveled face and the rack teeth being also provided with repulsion beveled faces for engagement with the said repulsion face of the dog.

FREDERIC W. HILLARD.

In the presence of—
SAMUEL W. BALCH,
HY. H. WHITMAN.